May 7, 1935. J. J. BATTERMAN 2,000,461
VULCANIZER FOR REPAIR OF INNER TUBES
Filed Nov. 11, 1932 5 Sheets-Sheet 5
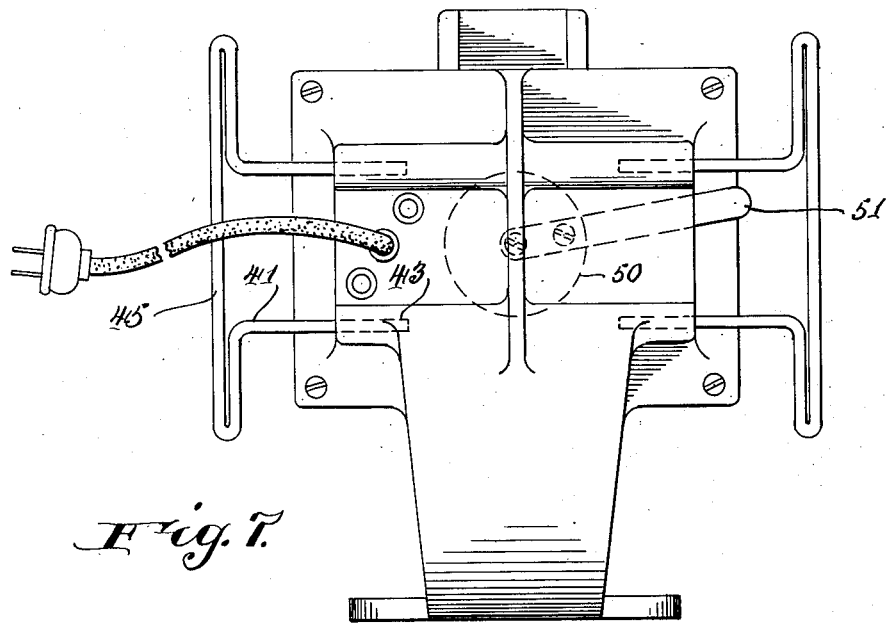
Fig. 7.
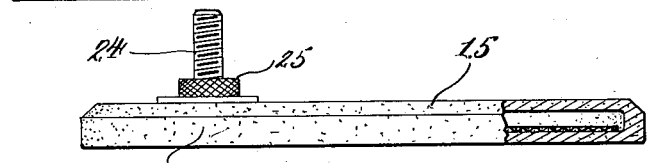
Fig. 9.
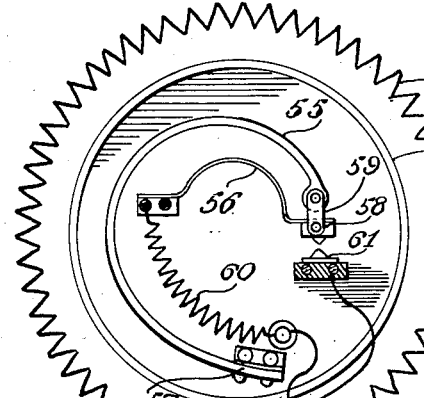
Fig. 12.
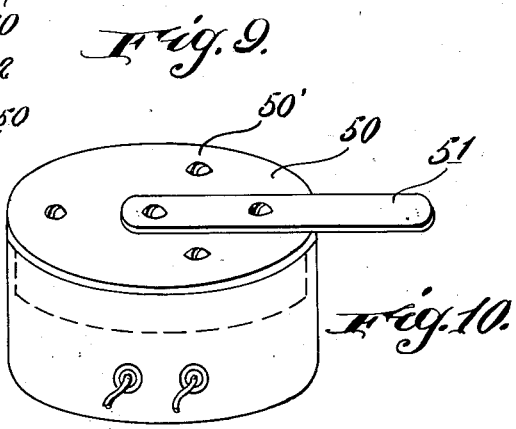
Fig. 10.
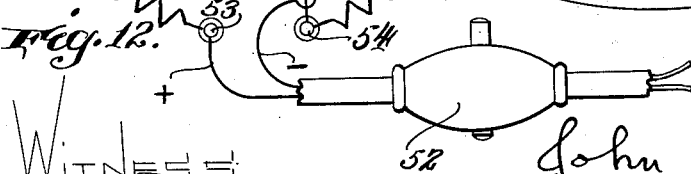

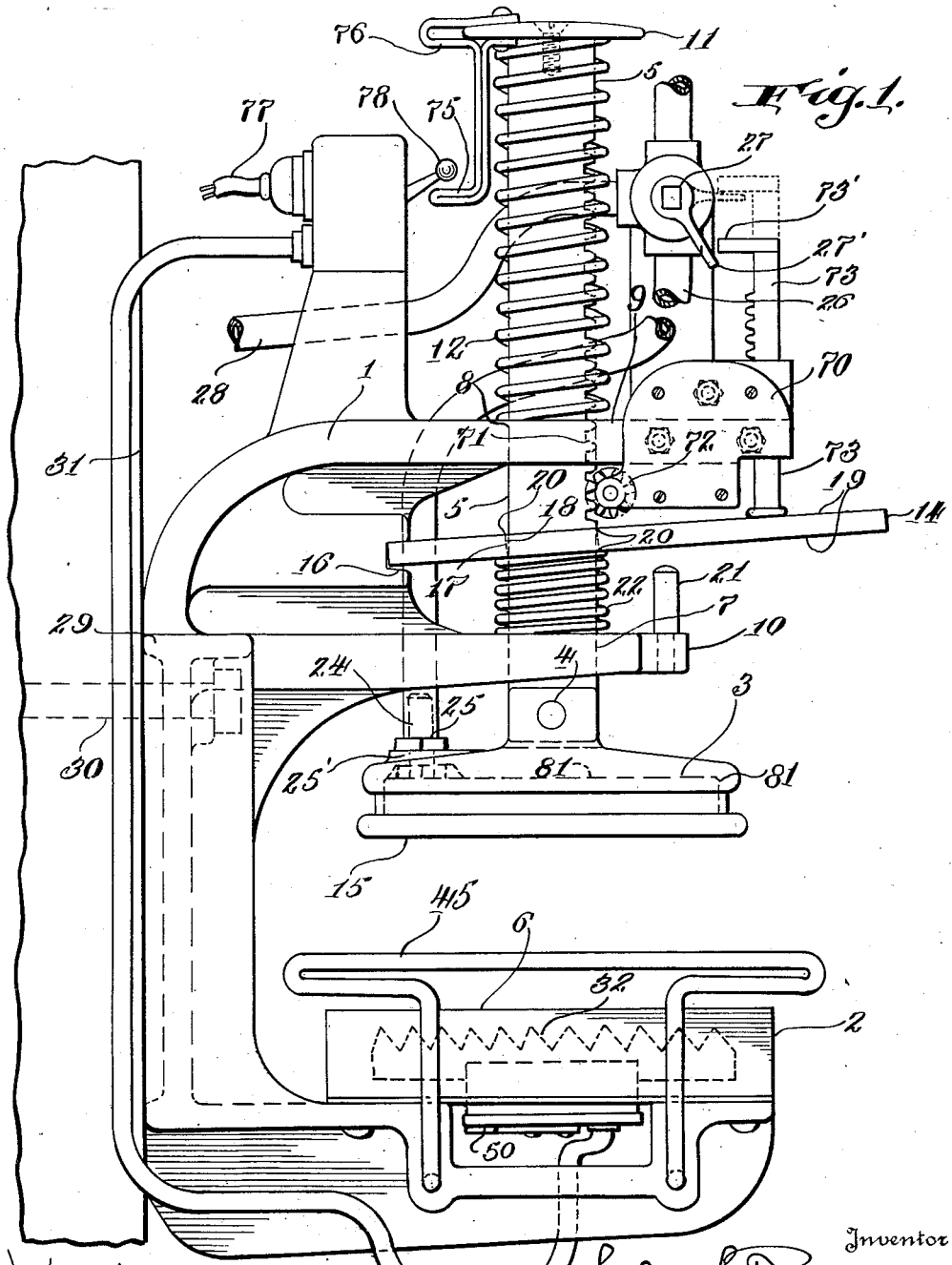

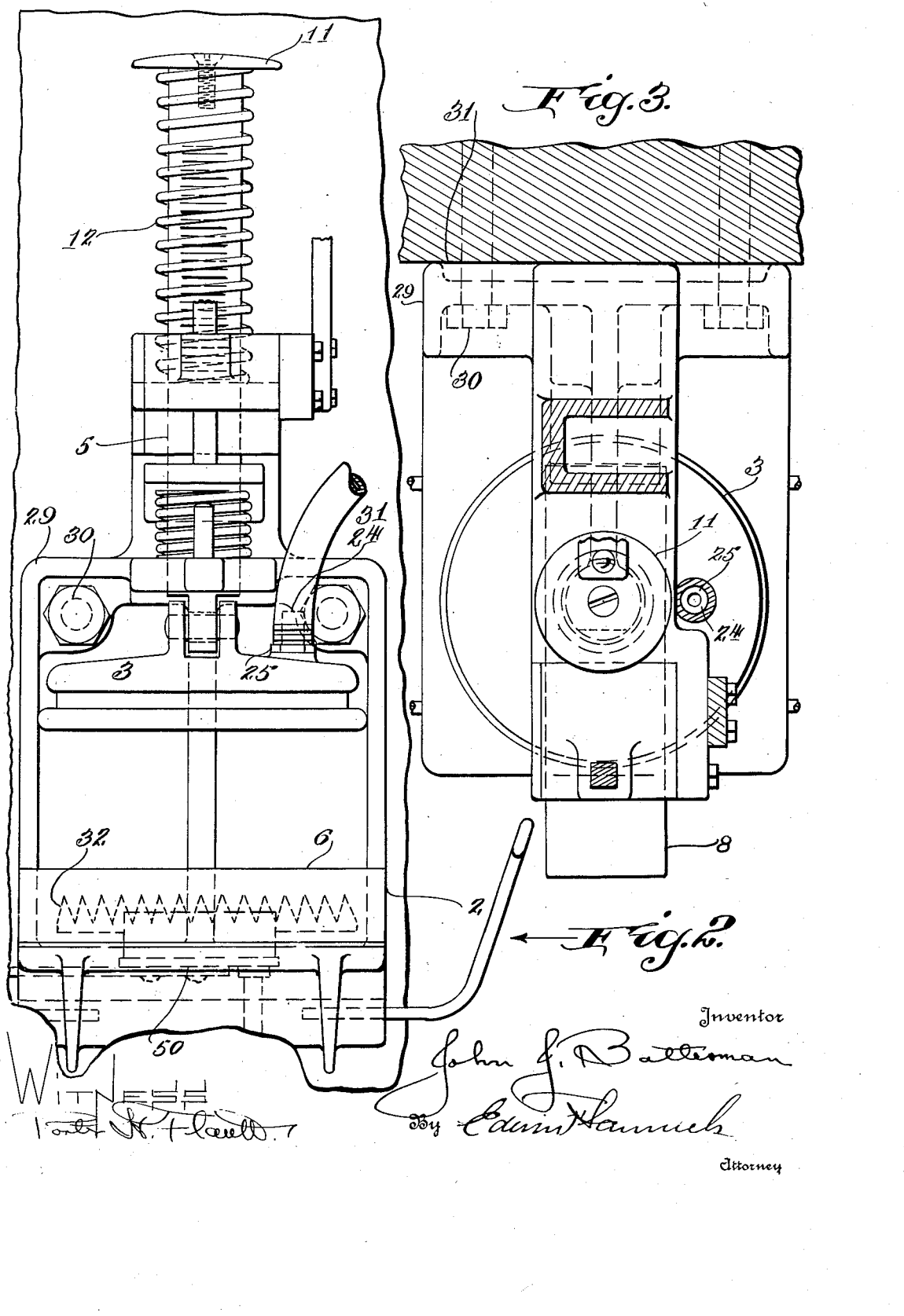

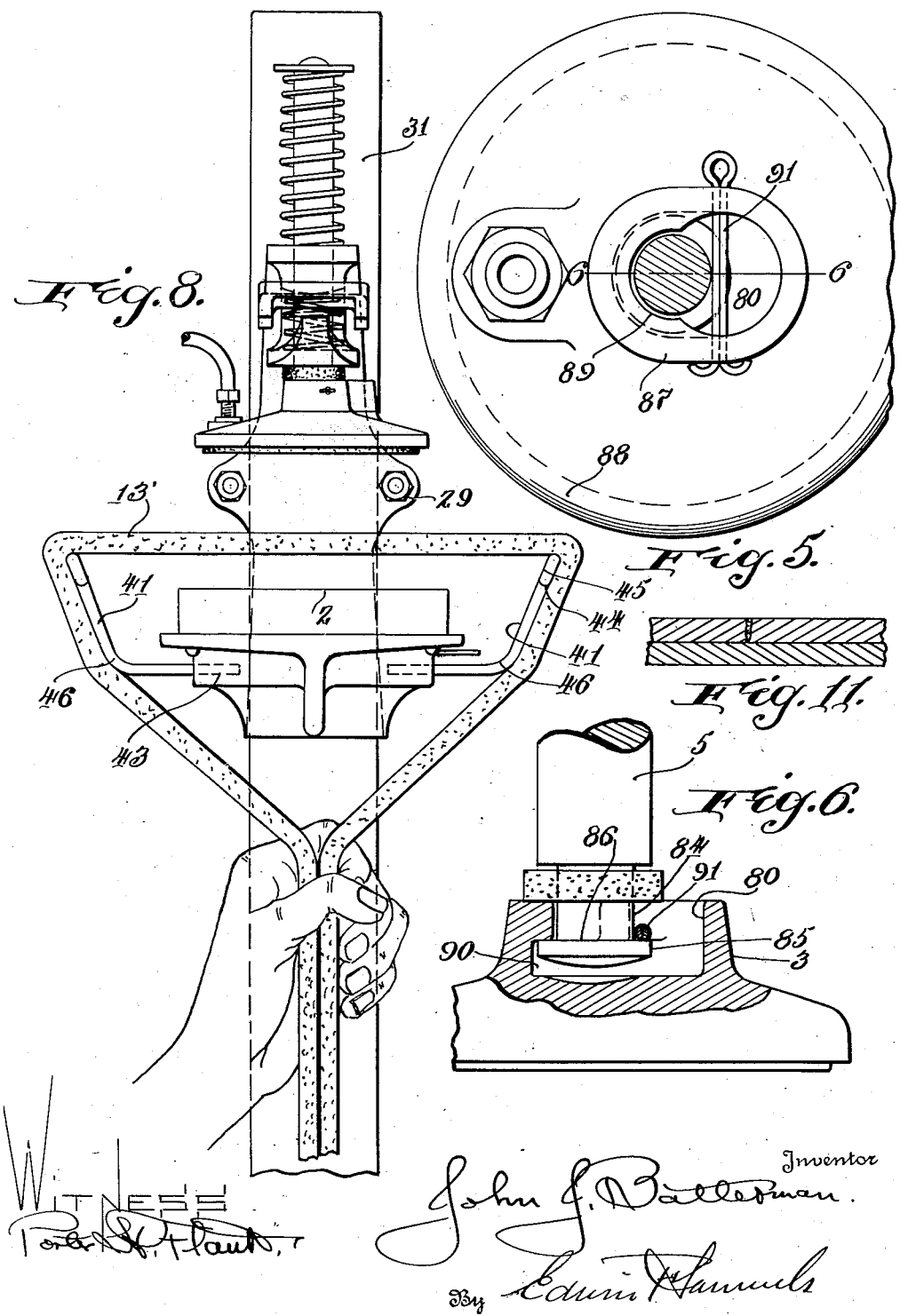

Patented May 7, 1935

2,000,461

UNITED STATES PATENT OFFICE 2,000,461

VULCANIZER FOR REPAIR OF INNER TUBES

John J. Batterman, Cleveland, Ohio, assignor to Gabriel Pneumatic Vulcanizer, Incorporated, Cleveland, Ohio, a corporation of Ohio Application November 11, 1932, Serial No. 642,189

17 Claims. (Cl. 18—18)

The invention relates to a vulcanizer particularly adapted to the repair of the tubes and casings of pneumatic tires, though it may be used in the repair of almost any article of rubber or other similarly vulcanizable material.

Vulcanizers now in general use for these purposes have heavy springs or otherwise require considerable exertion to clamp them on the work and to open them. The apparatus at present in general use with a three to one leverage requires the application of a hundred pounds pull or thrust to the lever to give three hundred pounds working pressure on the entire surface of the tube in contact with the hot plate, while with the improved apparatus of the invention all necessity for muscular effort on the part of the operator is eliminated, so that the only convenient position for the apparatus is on or near the floor which makes it necessary for the operator to stoop and rise every time he inserts the work in the vulcanizer or removes it.

The new type of vulcanizer is supported on the wall at the height of the eye or at any convenient height, so that the operator can see both the top and bottom of the work, and can locate and spot his work to the best advantage.

As an alternative to the wall support the new vulcanizer may be provided with a stand which consists of an upright pipe or bar with a suitable base or pedestal. The vulcanizer is secured to the upright in a manner which permits it to be adjusted up and down and to be secured at a convenient height. This apparatus equipped with the stand is particularly adapted for use in garages, oil stations and the like, where tire and tube repair work is done at intervals only, because it can be put away behind a door or in any other convenient position, so that it does not occupy bench or floor space in the busier area of the shop.

The feasibility of thus locating the vulcanizer at a convenient height, so that the operator can view both sides of the work without difficulty, is largely dependent upon the new type of clamp or closure which is operated without effort, the top member or pad being held automatically at any height within certain limits relatively to the hot plate or bottom member, and clamped automatically in any position between these limits whenever it is brought into close contact with the work, providing for the treatment of tubes or casings or other work of any thickness, and it may be likewise instantaneously released when the working pressure is relaxed as hereinafter described.

The pressure member and pad, i. e., the movable member, is returned automatically by a light spring to loading position when the clamp is disengaged.

The automatic locking and release of the clamp are of particular advantage, as the upper member or the pressure member engages the work by and through an inflatable or pneumatic pad, and the clamp is of such a nature that it locks more rigidly as the air pressure and hence the stress applied to it is increased. The clamp is also released instantaneously without effort when the air pressure is relaxed and the bag is deflated.

While the apparatus is intended for application to the repair of rubber articles in general and of any kind of inner tube, the pressure member including the pneumatic pad, as applied in the improved type of vulcanizer is of particular importance in connection with the vulcanizing of compression tubes, i. e., the type of tube which is made with a thickened externally convex tread portion which is inverted by turning the tube inside out in order to give an externally concave tread, producing the effect of compression when the tube is inflated, bringing the tread to an externally convex form. This type of tube when vulcanized as to the tread portion in any apparatus which lacks the resiliency and uniformity of pressure of the air bag, loses its punctureproof compression feature due to the flowing of the heated rubber under pressure away from the point of repair. With the air bag, however, pressure is applied uniformly to the entire area surrounding the patch, which causes an inward pressure toward the center of the area contacted by the bag as well as a pressure normal to the surface of the hot plate, with the result that there is little or no loss of the compression feature of the tread. It is of further advantage in the repair of all tubes and casings and other articles that by means of an inlay, i. e., the insertion of the rubber into the cut or break to be repaired, the edges surrounding the wound or cut being pressed together by the action explained, are banded tightly throughout their contacting area, making a repair which is equal in resistance to the original tube without the necessity for thickening or reinforcing the repair.

The vulcanizer also includes an improved type of air bag of disklike or otherwise flat formation which is completely flexible as to both its upper and lower walls, so that in effect it is adapted to expand in both directions when inflated. The fact that it is seated in a cavity in the pressure member does not interfere with this action.

The apparatus of the invention may also be provided with a temperature control which is preferably adjustable as to the temperature of vulcanization, making it possible to treat old tubes and cheaper tubes of inferior quality which will not stand the maximum heat without deterioration and consequent loss.

The disclosure also includes a time control whereby the current is shut off and the vulcanizer opened automatically at a predetermined time.

A difficulty which has been encountered is due to the disfigurement and even to the destruction of tubes and other work on account of contact with the edges of the hot plate at points on each side of the inlay.

This difficulty has been overcome by the provision of a rack or guard which supports the tube or other work on each side of the hot plate. This guard consists of a horizontal supporting member on each side of the hot plate extending transversely to the direction of the length of the tube. These guards are located slightly above the level of the hot plate, and not only keep the tube or other work out of contact with the edges of the hot plate, but serve as a convenient support for the tube, making it easily and conveniently possible to lay the tube flat as to both sides of the tube prior to clamping the vulcanizer, thus preventing wrinkles and creases, it being understood that while thus stretched across the rack or guards, both sides of the tube are visible to the workman, so that the patch is easily and conveniently located in the center of the hot plate.

Further advantages of the improved apparatus as compared with the prior art devices are that it holds the tire or tube with uniform pressure throughout the area surrounding the repair, so that a resultant pressure is exerted toward the spot being cured, such pressure being in addition to the pressure at right angles to the hot plate. In all other types of vulcanizer the resultant pressure parallel to the hot plate is away from the cure or repair. The cure produced by the apparatus of the invention, largely due to the inward pressure, is as strong as the original tire or tube without reinforcement. This is the only method of producing a cure or repair as to a long slit or other wound by joining the edges of the damaged part together with a very thin layer of repair material applied to the edges only, and without reinforcing and thickening the tube at the repair.

The apparatus is simple in construction with a minimum number of parts and very little chance to get out of order and is positive in its action and very easy to operate, requiring practically no muscular effort to clamp and release the work. It produces work of the highest character and of presentable appearance, equal in strength to the original tube or tire without the exercise of skill on the part of the operator, so that it requires no experience to operate.

The improved vulcanizer heats instantaneously, being ready for use as quickly as the patch can be prepared. The curing time is reduced as compared to the earlier apparatus because with the accurate control, higher temperatures can be employed and a uniform pressure is applied without injury to the work.

The guard or support is of particular importance in making the apparatus fool-proof, as it requires no extra labor, attention or effort to protect the tube from the edges of the hot plate. It is practically impossible to so place the tube on the hot plate as to bring the tube in contact with the edges, and the guard is of great advantage in that it enables the operator to stretch the tube flat at the time that the vulcanizer is closed, the arrangement being such that he can observe the patch as the pressure member is lowered, assuring himself that it is properly placed relatively to the hot plate and that there are no wrinkles.

The apparatus also has the important advantage that it is easily closed, locking the pressure member in the desired position in relation to the hot plate, clamping the work in position with slight effort, after which the air pressure is introduced, applying uniform pressure throughout the area including and surrounding the repair which is covered by the pad.

In the accompanying drawings I have illustrated an apparatus embodying the features of the invention in the preferred form.

In the drawings:

Figure 1 is a side elevation of a vulcanizer embodying the invention.

Figure 2 is a front view of the same.

Figure 3 is a top plan view of the vulcanizer.

Figure 5 is a section on line 5, 5 in Figure 4 showing the joint between the pressure member and its guide rod.

Figure 6 is a section on the line 6, 6 of Figure 5.

Figure 7 is a bottom plan view of the vulcanizer of Figures 4, 5 and 6.

Figure 8 is a front view of the same with a tube in place just prior to clamping, a portion of the tube being shown in section.

Figure 9 is a detail of the pneumatic pressure pad.

Figure 10 is a perspective view of a thermostat which has been used with this apparatus.

Figure 11 is a section showing the new repair method.

Figure 12 is a circuit diagram of the heating unit and thermostat.

Figure 4:
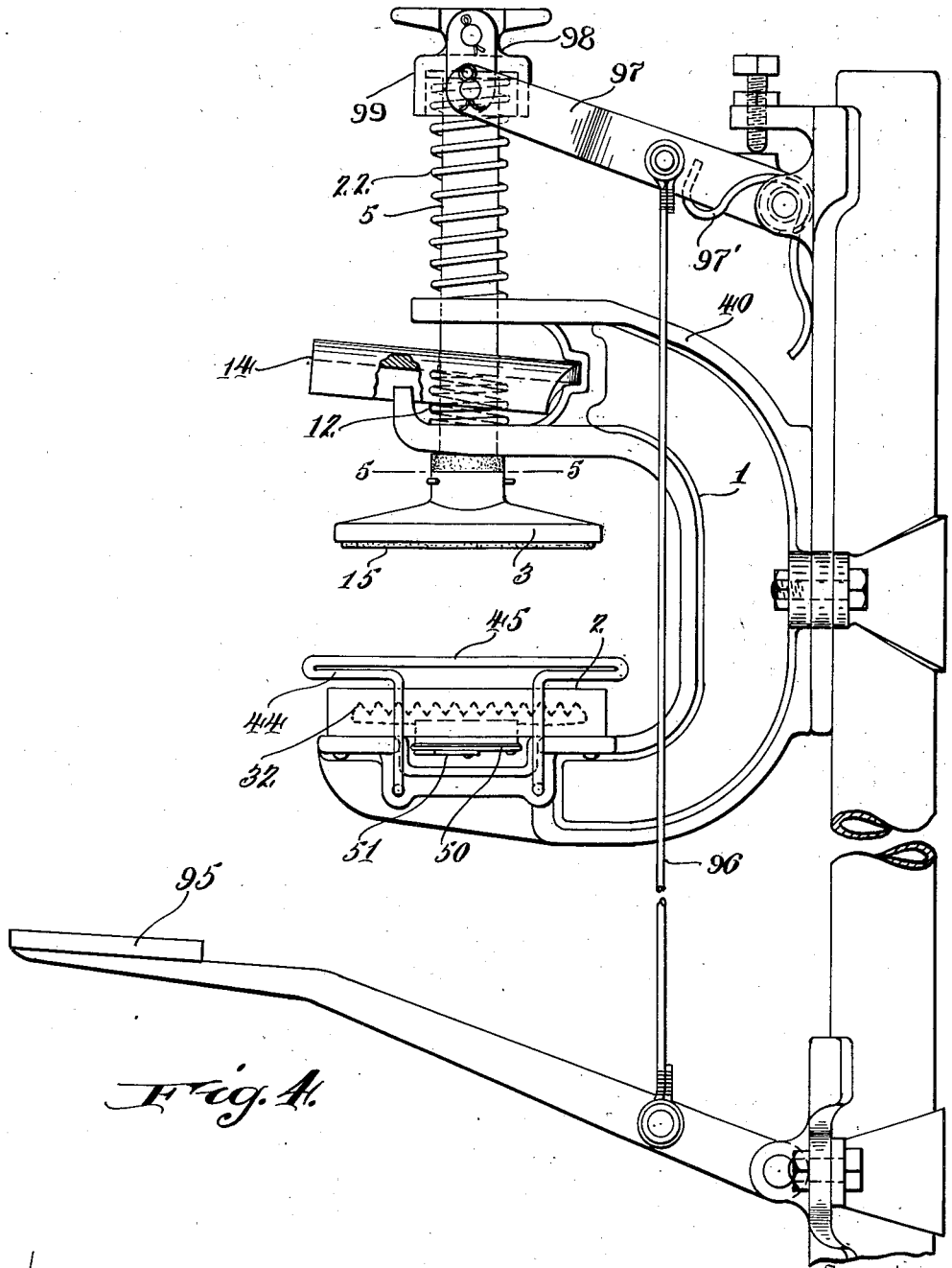
Figure 4 is a side elevation corresponding to Figure 1 of a present commercial form of the vulcanizer also including the thermostat and temperature control, and showing the guard in detail.

Referring to the drawings by numerals, each of which is used to indicate the same or similar parts in the different figures, and having particular reference to Figures 1 to 3, the vulcanizer consists of a C shaped or a similar frame 1 on which are mounted the hot plate 2 and the pressure member 3. The latter is loosely connected as by means of a hinge joint 4, to the lower end of the plunger rod 5 which is mounted to slide in a vertical direction at right angles to the working surface 6 of the hot plate 2 through spaced, aligned slide guide bearings 7 and 8 carried by the upper arm of the C-shaped frame 1, the same being provided with parallel lugs 9 and 10 for this purpose. The plunger rod 5 is shown as provided with a removable head 11 between which and the top lug 9 a coil spring 12 is confined, the same being shown as encircling the upper portion of the rod 5 above the lug 9.

Between the lugs 9 and 10 is the clutch plate 14 which controls and locks the pressure guide rod 5, locking the pressure member 3 in operative relation to and with the work, providing for the application of vulcanizing pressure through and by means of the pneumatic pad 15, which is carried by the pressure member and is to be further described. The clutch plate 14 is seated at its inner end in a notch 16 which is spaced from the rod 5. This notch in the form of the invention shown is located in the C shaped frame 1 between the upper and lower lugs 9 and 10 which guide and control the rod 5. This clutch plate 14 is provided at an intermediate point, which is shown as slightly off center, with an opening 17 adapted to receive and pass the rod 5. This opening is slightly larger than the cross-section of the rod, and its side walls at 18 are preferably at right angles to the top and bottom surfaces 19 of the plate, the corners or edges 20 of the opening being preferably well defined and rectangular. This causes the rod to bind and become locked in its position relatively to the plate or vice versa when the plate is rocked slightly from a right-angular position relatively to the rod as shown by supporting it oppositely to the thrust applied to the rod, the point of support for the plate at 16 being suitably removed from the plunger rod 5.

A light helical spring 22 is shown as encircling the rod 5 between the plate 14 and the lug 10. This spring supports the plate 14 in a normal position, as shown, in which the plate is inclined slightly upwardly and outwardly from the notch 16, the rod 5 and the pressure member 3 being in the raised or withdrawn position, in which they are supported by the spring 12 which should be of little more than sufficient tension for this purpose.

The illustration also includes a stop 21 seated in the lug 10 and extending upwardly beneath the plate 4 and serving as a stop to support the plate when pressed downwardly to a substantially horizontal position or any position in which the edges 20 of the opening are so placed that the rod 5 is free to slide. The upper end of the stop 21 is shown as substantially in line horizontally with the bottom of the notch 16, it being understood that if the angle of the opening 18 with the plate 14 be changed, the various positions of the plate would be similarly changed.

The operation of the clutch may be described as follows: When the work is placed on the hot plate 2 on the working surface 6 or immediately above the same, i. e., between the working surface 6 and the lower surface of the pad 15, the plunger rod 5 and the pressure member 4 are moved downwardly, bringing the latter in close contact with the work by pressure of the hand on the head 11 which slides the rod 5 through its bearings 7 and 8, and compresses the light spring 12. The spring 22 is of tension only sufficient to support the plate 14 in its upper position, as shown, from which position it yields but slightly if at all to the friction of the rod 5 as it passes downwardly. The stop 21 prevents downward movement of the plate 14 to an extreme position which would lock the plunger against downward motion. In yielding, the plate 14 is moved only sufficiently to release the rod 5. The slight downward yielding of the plate contributes to the freedom with which the rod passes downwardly through the plate. When the rod and the pressure member 3 have descended so that the pad 13 is brought in close contact with the work, any convenient manual pressure, or foot pressure, if desired, being applied for this purpose and the hand is withdrawn from the head 11, the tendency of the spring 12 to raise the rod 5, and the pressure member 3, is sufficient to effect a clamping of the rod 5 relatively to the plate 14, and the plate 14 being held normally in or substantially in its uppermost position by the spring 22, there is in effect no yielding whatever of the pressure member 3 and the rod 5 after the pressure member or the pad carried thereby has been brought in close contact with the work as aforesaid, and any increase in the upward tendency applied to the rod 5 as by the inflation of the pad 15 applying uniform pressure to the work, increases the rigidity with which the rod 5 is locked in its relation to the plate 14, and the latter being of rigid construction and seated at one edge in the notch 16, there can be practically no yielding of the pressure member 3.

Having further reference to the structures shown in Figures 1 to 3, the pad 15 is secured in the pressure member 3 in any suitable manner. It is most conveniently provided with a valve stem 24 which is engaged by a nut 25 holding the pad and valve stem in position.

The details of the air bag are regarded as embodying an important feature of the invention. This air bag 15, see Figure 9, is preferably so made of rubber and fabric that it is free to expand in both directions, i. e., as to both the upper and lower surface, so that it may expand upwardly into the pressure member 3 and downwardly toward the work, and is most efficient in taking up the irregularities of the surface of the work. Though this bag is supported in a cavity 81 within the pressure member, the ability of the bag to expand freely in both directions adds greatly to its flexibility, and as aforesaid, to its ability to take up the irregularities of the work and apply uniform vulcanizing pressure at all points. It is also particularly effective in flattening casings as well as tubes against the hot plate so that forms are practically unnecessary. Also, it has particular advantages in the repair of compression and similar tubes on account of its ability to apply uniform pressure to tubes of varying thickness.

The bag in the preferred form is made of two sheets of vulcanizable rubber fabric lined with sheet rubber and having linen or equivalent material, preferably sized, as tracing cloth, between the sheet rubber to prevent sticking. The bag, as shown, is of disklike formation, with a valve stem 24 of the usual type used in connection with inner tubes, the same being held in place in the present instance by the thumb nut 25. The valve tube may be provided with a plunger, or the plunger valve may be omitted, depending upon the nature of the air pressure connections provided for the inflation of the pad in the vulcanizing operation.

As illustrated in Figure 1, the valve stem and nut being used to hold the pad in position in the pressure member 3 as a support or base for the nut 25, the pressure member 3 is provided with a boss 25'. The pad 80 is preferably, as already stated, of disklike formation and is of a diameter which permits it to fit closely within the cavity or pocket 81 in the member 3, so that when the nut 25 is in place, there is no tendency for the pad to slip out of the pocket.

Figure 1 shows the valve stem connected by a flexible tube 26 to a shut off valve 27 of the three way type which is connected to a supply of air under pressure by way of a tube 28. The three way valve has a discharge opening at 27'.

In the form of the invention shown in Figures 1, 2 and 3, the vulcanizer member particularly the C-shaped frame 1, is provided with a back plate 29 which is secured by bolts 30 to a wall or other suitable support 31 which may be a portable upright.

The hot plate 2 is shown as provided with an electric heating unit 32 embedded therein and adapted to heat the working surface 6 at the will of the operator.

Referring now to the construction shown in Figures 4 to 8, which is at present regarded as the commercial form of the invention, the C shaped frame 40 is provided with lugs 42 to receive the ends 43 of two guard members 41 which in the preferred form as shown are formed of heavy wire or commercially obtainable metal rods of about ¼ inch diameter. These guards may be referred to as of T shape having a head 44 which presents an upwardly disposed horizontal rounded member 45. These members 45 which are the essential features of the guards, may be supported in any suitable manner. The supporting members 45 are disposed on the opposite sides of the hot plate 2 and transversely to the tube being repaired, as best shown in Figures 7 and 8. The shank of the T at 46 is bent as shown, so that the end portion 43 inserted in the C frame is horizontal, the guards being preferably removable for convenience in packing, though this exact arrangement is not essential. The portion of the shank nearer the cross arm portion or horizontal member 45 is nearly upright.

Figure 8 shows the manner of utilizing the guard to support the tube or other work prior to clamping, it being apparent from the illustration that the guard holds the work 13' above the plate, and permits it to be stretched horizontally so that the operator can observe the repair and center it on the hot plate before pressing the plunger rod 5 and pressure member 3 downwardly to bring the latter into engagement with the work. The operator would otherwise have to raise the tube from the plate to see the repair, and could easily burn his hands on the hot plate and form wrinkles particularly in the under side of the tube in replacing it. These difficulties are actually known to occur in practice. This guard has been favorably passed upon by well-known experts in this art, and endorsed by them as an important improvement in repair vulcanizers.

The illustration, Figures 12 and 7, also includes a thermostat 50 connected in circuit with the heating unit and having an adjusting lever 51 whereby the temperature of curing is controlled. The construction also includes a switch 52 for making and breaking the heating circuit. The thermostat may be of any suitable form, a convenient form being shown in perspective in Figure 10. The plate 50' is rotated through any predetermined arc to accomplish the desired variation in the temperature of the heating coil which bears a definite relation to the temperature of curing.

The circuit diagram shows heating coil 32 in circuit with which the binding posts 53 and 54 of the thermostat are included. Any suitable type of thermostat may be employed. The thermostat shown comprises a bi-metallic strip 55 which is bowed in the usual manner and connected to a moving contact 58 at one end and secured to a stationary portion of the frame at the other end at 57. A bowed spring 56 carries the moving contact point 58 connected by a link 59 to the end of the bi-metallic strip, and the thermostat includes a pre-heat coil 60 near the bimetallic strip 55 and connected to the terminal 54. A stationary contact 61 suitably located in the path of moving contact 58 is connected to one side of the circuit, and the terminal 53 which is connected to the heating coil 32 is connected to the other side of the energizing circuit. The heating of the bi-metallic strip from helical coil 60 flexes the spring 56 and moves the contact 58 into and out of engagement with the stationary contact 61 which latter is carried by the rotary plate 60 so that by adjusting its position the temperature at which the thermostat makes and breaks the circuit is controlled.

The apparatus may also include a time control 70 most conveniently of the clockwork type. This is wound by a rack 71 on the guide plunger 5 which engages a pinion 72 in said time control. This time control operates a release plunger 73 which at the time predetermined by the clock work moves downwardly. The plunger carries a lug 73' adapted to engage lever 27' of the three way valve 27 opening it and releasing the air pressure in the pad. Immediately thereafter the upward thrust of the air bag against the plunger and hence against the clutch plate having been relieved, the plunger 73 pushes the clutch plate 14, Figure 1, downwardly toward stop 21, releasing the plunger 5 and permitting it to move upwardly raising member 3 and the pad 8 with the work by the expansion of the spring 12. In the automatic form shown, Figure 1, the plunger 5 is provided with a lug 75 which on the upward releasing motion of plunger 5 engages and throws a switch 78 in the heating circuit 77, whereby the switch is opened as the pressure member 3 moves to its uppermost or withdrawn position, shutting off the current so as to prevent burning of the work. When the plunger is lowered to engage the work, the switch is oppositely engaged and the heating circuit closed by lug 76.

In the construction shown in Figures 4, 5, 6, etc., an improved form of joint has been provided for connecting the pressure member 3 to the plunger rod 5. In the construction, Figures 4, 5, 6, the plunger rod is provided at its lower end portion with a reduced shank 84 which carries a head 85 of relatively large diameter so that there is a horizontal upwardly disposed shoulder 86 at the top of the head and at the lower end of the shank. The pressure member 88 of the form shown in Figures 5 and 6 is provided at its top with a socket projection 87 having an enlarged upwardly disposed entrance or insert opening 80, see Figure 5, which is connected to a reduced engaging portion 89 which fits the shank 84 and overlies the socket cavity 90. To engage the pressure member with the plunger rod the head is inserted in the opening 80, and the pressure member 86 is moved to the right, causing the head or ball 85 to enter the socket cavity 90, the shank 84 entering the engaging portion 89. To hold the parts in their assembled relation, a cotter pin 91 is passed through the socket member 87 back of the shank 84, entering suitable openings in the walls of the socket portion 87 provided for this purpose.

Figure 4 shows the vulcanizer open, the plunger 5 being lowered by means of a foot pedal 95 which transmits downward pressure of the foot on the pedal, by way of a tension rod 96 to a swinging lever 97 which is given an upward tendency by spring 97' and lever 97, and is connected by a link 98 to a cap 99 on top of the plunger. This may also be used after the manner of cap 11 to lower the plunger and pressure member by manual pressure.

The vulcanizer in this instance is mounted on an upright shown as a pipe which would stand on a pedestal not shown. The upright may be used to support other equipment and the whole may be stowed behind a door or in any convenient locality when not in use.

In the practice of the method of the invention in the repair of a cut or similar injury, the meeting edges only are coated with vulcanizing compound. The tube is then placed on the rack over the hot plate or on the hot plate; the plunger is lowered and clamped after which the pad or air bag is inflated applying vulcanizing pressure; at the same time the circuit is closed through the heater.

The application of uniform pressure by the air bag has the effect of pressing the rubber inward radially toward the cut as well as compressing it at right angles to the sheet, thus bringing the entire area of the edges of the cut into close contact. In this way a perfect repair is effected without thickening the rubber or losing the puncture closing action by concave convex compression if the repair is in connection with a self healing tube of the compression type. More important than any other consideration, the repair is as strong as the uninjured portion of the rubber, which is not true of other repair work in this line.

Experiment has shown that the apparatus is equally applicable to the repair of tubes, and of casings of the balloon type which are easily flattened by the action of the air bag with a few possible exceptions in connection with repairs near the edge of the tread, when profile plates may be used.

It is particularly adapted to use in the repair of the new large type of casing for use at low pressures and called "air wheel type". The air bag easily flattens the sides of the casing so no forms are necessary.

The apparatus is also of particular advantage in the repair of compression tubes and other tubes having a thickened tread portion, as the air bag equalizes the pressure applying equal vulcanizing pressure to the entire area engaged without regard to the variations in thickness.

The convenience and portability of the apparatus and its increased efficiency and adaptability as compared with any other type now in use has been fully discussed and brought out in the preamble.

I have thus described specifically and in detail an apparatus embodying the invention in order that the manner of constructing, applying, operating and using the invention may be fully understood, however, the specific terms herein are used descriptively rather than in a limiting sense, the scope of the invention being defined in the claims.

What I claim as new and desire to secure by Letters Patent is:

1. In a vulcanizer for the repair of inner tubes and casings of pneumatic tires, a hot plate, a pressure member with an inflatable pad for applying vulcanizing pressure to the work on the hot plate, a plunger carrying the pressure member and pad, the plunger being guided to move toward and from the hot plate substantially at right angles thereto, automatic clamping means adapted to hold the plunger and pressure member against retraction in a series of positions as it is advanced toward the work, and separate means for releasing the clamping means permitting the plunger and pressure members to be freely retracted, said means for clamping the plunger being adapted to hold the same rigidly at pressures which are in excess of the pressure of vulcanization.

2. In a vulcanizer for the repair of inner tubes and casings of pneumatic tires a hot plate, a pressure member with an inflatable pad for applying vulcanizing pressure to the work on the hot plate, a plunger carrying the pressure member and pad, the plunger being guided to move toward and from the hot plate substantially at right angles thereto, automatic clamping means adapted to hold the plunger and pressure member against retraction in an infinite number of initial pressure positions as it is advanced toward the work, and separate means for releasing the clamping means, permitting the plunger and pressure members to be freely retracted, said means for clamping the plunger being adapted to hold the same rigidly at pressures which are in excess of the pressure of vulcanization, the clamping pressure being automatically increased as the pressure on the work is increased.

3. In a vulcanizer for the repair of inner tubes and casings of pneumatic tires, the combination with a hot plate of a pressure member, a yielding pad carried thereby, a plunger carrying the pressure member and mounted to be freely moved toward and from the hot plate in a direction normal thereto of an automatic one way clamp operating to lock the plunger against retraction from the work in each and every position which it assumes in advancing, and means for instantaneously releasing said locking means permitting the plunger and pressure member to be retracted.

4. In a vulcanizer for the repair of inner tubes and casings of pneumatic tires, the combination with a hot plate of a pressure member, a yielding pad carried thereby a plunger carrying the pressure member and mounted to be freely moved towards and from the hot plate in a direction normal thereto of a one way clamp adapted to lock the plunger against retraction from the work in each and every position which it assumes in advancing, and means for releasing said locking means permitting the plunger and pressure member to be retracted, said locking means consisting of a rigid member arranged transversely to the plunger and provided with means for engaging the opposite lateral sides of the plunger, means for holding one end of said transverse member substantially stationary, said means having a gripping action whereby it locks the plunger as the rigid member is rocked, the releasing means serving to rock the rigid member oppositely to the direction in which it moves in locking.

5. In a vulcanizer for the repair of inner tubes and casings of pneumatic tires, the combination with a hot plate of a pressure member, a yielding pad carried thereby, a plunger carrying the pressure member and mounted to move toward and from the hot plate in a direction normal thereto of a one way clamp adapted to lock the plunger against retraction from the work in each and every position which it assumes in advancing, and separate means for releasing said locking means permitting the plunger and pressure member to be retracted, said locking means consisting of a rigid member arranged transversely to the plunger and apertured to pass the same, means for holding one end of said transverse member substantially stationary, said aperture having gripping means to engage the plunger as the rigid member is rocked, and means for locating said rigid member in releasing position in which the plunger moves freely relatively to the hot plate.

6. A vulcanizer for use in the repair of inner tubes of pneumatic tires and the like, the same comprising a hot plate, means for applying vulcanizing pressure to the work on the hot plate and supports for the tube spaced slightly above and on opposite sides of the hot plate for preventing contact of the work with the edges of the hot plate and consequent injury to the work.

7. In a vulcanizer for use in the repair of inner tubes for pneumatic tires and the like having a hot plate and means for applying vulcanizing pressure to the work on the hot plate, work supporting means on opposite sides of the hot plate and spaced above the same to prevent contact of the work with the edges of the hot plate, providing a support for the work prior to the application of pressure, enabling the operator to view both sides of the work in the vicinity of the repair and to draw the work taut at the point of repair at the time of initial application of vulcanizing pressure.

8. In a repair vulcanizer for inner tubes, a hot plate, means for applying vulcanizing pressure to the work on the plate, means for supporting the work to permit tension to be applied to the work by gathering the depending portion of the work in one hand beneath the hot plate, the work supporting means being located at each side of the hot plate so the work thereon is caused to span the hot plate, keeping the work away from the edges of the hot plate and serving to support the work in line with the hot plate as tension is applied by the hand of the workman gathering the portions of the work beneath the hot plate.

9. In a repair vulcanizer for inner tubes, a hot plate, means for applying vulcanizing pressure to the work on the plate, means for supporting the work on the hot plate to permit tension to be applied to the work by gathering the depending portion of the work in one hand beneath the hot plate, the work supporting means being at each side of the hot plate to support the work in line with the hot plate as tension is applied by the hand of the workman gathering the ends of the work beneath the hot plate, the work supports being slightly above the level of the hot plate so as to prevent contact of the work with the edges of the hot plate and to enable the operator to view both sides of the work.

10. The combination in a vulcanizer for the repair of inner tubes, tires and the like of a hot plate, an inflatable pad for applying uniform vulcanizing pressure to the work, a clamp for holding the pad in contact with the work, means for leading fluid under pressure to the pad, means for supplying heat to the hot plate, and time controlled means operating at the end of a predetermined vulcanizing period for releasing the fluid pressure from the pad and for releasing the clamp, and for cutting off the heat from the hot plate performing their operations automatically and in suitably timed relation.

11. In a vulcanizer for inner tubes and tires, a hot plate, a plunger with means for guiding the same in a direction substantially normal to the plate, a pressure member carried by the plunger and moved therewith into and out of work holding relation to the plate, a resilient pad supported on the pressure member oppositely to the work, means for inflating the pad to apply vulcanizing pressure to the work, and means for locking the plunger to hold the pneumatic pad in operative contact with the work, comprising a transverse member engaging the plunger from opposite sides, the transverse member having an edge portion disposed toward the plunger to engage and clamp the same as the transverse member is rocked, stationary means for securing the transverse member at a point remote from the plunger, and means for supporting the transverse member to hold it in normally released relation whereby the plunger can be moved downward freely to bring the pad into contact with the work, the normal position of the transverse member being so determined that it contacts the plunger and is barely released, being just on the point of engagement, so that the slightest upward tendency of the plunger locks it rigidly in work engaging position, and a stop for positioning the transverse member, the stop on the side of said member toward the work, so that by engaging the transverse member on the opposite side of the plunger from the stationary support and forcing it toward the work, the plunger is released permitting it to be withdrawn, and means for inflating the pad to apply vulcanizing pressure to the work, the same being in excess of the pressure at which the apparatus is initially clamped in engagement with the work.

12. In a vulcanizer for use in the repair of inner tubes and casings for pneumatic tires, a hot plate, a pressure member of cuplike formation with means for holding the same in work clamping relation to the hot plate, the cup being shallow and having a substantially flat bottom wall, an air bag formed to fit within the cup and located therein, the bag having opposed substantially parallel walls of flexible material, one flat wall being exposed at the mouth of the cup and the other engaging said bottom wall, and a valve tube for admitting air to the bag, the tube extending through the wall of the cup which is perforated to pass it, the bag being adapted to expand freely in directions transverse to the parallel walls, said valve tube comprising the sole means of support for said bag within the cup.

13. A vulcanizer for use in the repair of inner tubes of pneumatic tires and the like comprising a hot plate assembly having a working surface associated therewith, means for applying vulcanizing pressure to the working surface on the hot plate and a support for the work secured to the hot plate assembly on each side of the hot plate for spacing the work above the working surface of the hot plate to prevent contact of the work with the edges of the hot plate.

14. A vulcanizer for use in the repair of inner tubes of pneumatic tires and the like comprising a hot plate assembly having a working surface thereon and means for applying vulcanizing pressure to said surface, a pair of removable supports secured to the hot plate assembly and extending upwardly above the working surface of the same on opposite sides thereof, said supports being adapted to receive the work thereon to permit the stretching of the same while maintaining the work spaced above the working surface of the hot plate and out of contact with the same.

15. The combination with a vulcanizer for the repair of inner tubes and the like of a hot plate, means for applying vulcanizing pressure to the work on the hot plate and including a plunger having a head movable with the plunger toward and away from the hot plate, electrical heating means including a circuit for the hot plate, means for holding the plunger in its advanced position to press the work against the hot plate, and time control means for releasing the plunger to remove the vulcanizing pressure, a switch for closing the circuit through said electric heating means, and means on said plunger operable upon movement of said plunger away from the hot plate for tripping said switch to open the circuit through the heating means.

16. In a vulcanizer for the repair of inner tubes and casings of pneumatic tires the combination with a hot plate, a resilient pad, a pressure member comprising a sliding rod, mounted to be freely moved to bring the hot plate and pad in their operative relation to the work and an automatic clamp to lock the sliding rod in each and every position which it assumes in advancing, and means for instantaneously releasing said automatic clamp, permitting the sliding rod to be retracted releasing the work.

17. In a vulcanizer for the repair of inner tubes and casings of pneumatic tires the combination with a hot plate and a resilient pad, a pressure member comprising a sliding rod, mounted to be freely moved to bring the hot plate and pad into their operative relation to the work and an automatic clamp to lock the sliding rod in each and every position which is assumes in advancing and means for instantaneously releasing said automatic clamp, permitting the sliding rod to be retracted, releasing the work, said automatic clamp comprising a rocking plate mounted transversely to the rod and having an aperture through which the rod is passed and means at the periphery of said aperture to engage the rod as the plate is rocked.

JOHN J. BATTERMAN.